H. WEILEDER.
AUTOMOBILE BUMPER.
APPLICATION FILED MAY 17, 1917.
1,234,986.
Patented July 31, 1917.
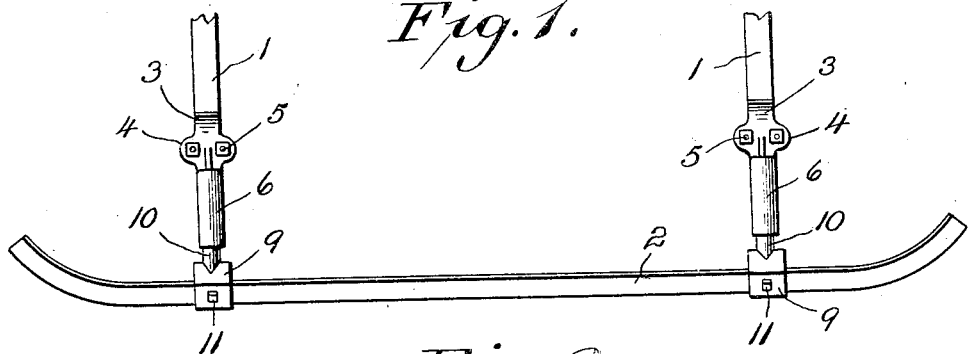
Inventor:
Henry Weileder

UNITED STATES PATENT OFFICE.

HENRY WEILEDER, OF MILWAUKEE, WISCONSIN.

AUTOMOBILE-BUMPER.

1,234,986.   Specification of Letters Patent.   Patented July 31, 1917.

Application filed May 17, 1917. Serial No. 169,167.

*To all whom it may concern:*

Be it known that I, HENRY WEILEDER, a citizen of the United States, and resident of Milwaukee, in the county of Milwaukee and State of Wisconsin, have invented certain new and useful Improvements in Automobile-Bumpers; and I do hereby declare that the following is a full, clear, and exact description thereof.

My invention relates to new and useful improvements in automobile bumpers, the principal object being to provide an improved connection between the automobile and bumper rod carrying parts.

In devices of this character the automobile bumper carrying members are usually united by means of a resilient connection which is designed to absorb any shocks which the bumper bar receives. In assembling these parts, those parts which project from the bumper bar are telescopically disposed within socketed members carried by the automobile, and detachable pins are extended through the first mentioned parts to retain them in the sockets of the members; it is extremely difficult in certain cases to remove these pins when it is necessary to dissemble these parts. Therefore, with this idea in mind the present invention has been devised, the same consisting broadly in providing a device for loosening these pins.

With this general object in view the invention resides in the novel features of construction, combination and arrangement of parts which will be hereinafter more particularly set forth and claimed, and shown in the accompanying drawing, wherein:

Figure 1 represents a plan view of a bumper bar attached by resilient connections to fragments of the side bars of a vehicle frame;

Fig. 2 is a vertical longitudinal sectional view through a device constructed in accordance with my invention;

Fig. 3 is a detail transverse section on the plane of the line 3—3 of Fig. 2; and Fig. 4 is a similar view showing the parts arranged in slightly different positions.

In the accompanying drawing it will be noted that this improved automobile bumper is attached by a conventional means to the downwardly extending front ends of the side bars 1 of an automobile frame. Each end of the bumper bar 2 is secured in the same manner, and this securement consists, in the present instance, of plates 3 having transversely extending apertured ears 4 through which U-shaped bolts 5 extend, said bolts being disposed around the bars 1 as most clearly shown in Fig. 2.

Upon each of the plates 3 is bolted or cast, or otherwise connected a substantially horizontally disposed cylindrical member 6 provided with a socket 7 which opens through the end of the member remote from its connection with said plate. At a point adjacent the inner end of the socket is formed an annular flange 8, the opening of which is considerably smaller than the opening into the socket.

The members which directly carry the bar 2 comprise sleeves 9 and shanks 10 which extend from said sleeve in planes at right angles to the axes thereof. The openings through the sleeves are of a shape to conform to the shape of the bumper bar 2 so that the same may be readily inserted therethrough or removed therefrom. Set screws 11 retain the bumper bar in position in the sleeves. The shanks 10 have their free end portions cylindrically reduced to form shoulders against which one end of expansion springs 12 abut, the other ends engaging the flanges 8 when said shanks are inserted in the sockets of the members 6.

The free ends of the shanks 10 extend through the restricted openings formed on the flanges 8 and are provided with transversely extending apertures 13, the axes of the same being parallel to the axes of the sleeves 9.

The apertures 13 are designed to receive pins 14 which are inserted thereinto through openings 15 formed through the under side of the members 6. The shanks and the members 6 are assembled before the bumper bar is placed in its position in the sleeves 9, this being necessary to permit the pins to be inserted since it is necessary that the apertures 13 be alined with the openings 15. As soon as the pins are in position the shanks may be rotated to aline the openings through the sleeves to place the bar 2 therein.

This rotation of the shanks, of course, disposes the pins 14 substantially horizontal and prevents their accidental removal. However, when it is desired to remove these pins it is found that they frequently are corroded and rusted so that it is exceedingly difficult to force them through the single opening 15. One opening is thus frequently of more disadvantage than two although the provision of the opening in the under side of the members excludes the majority of moisture from the sockets and it also eliminates the usual unsightly appearance of the device.

To facilitate the removing of the pins through the single openings the upper portions of the walls of the sockets between the flanges 8 and the ends of said sockets are provided with cam surfaces 16 against which the ends of the pins 14 will abut when the shanks are rotated to dispose said pins vertically. This position of the parts is shown in Fig. 4. It is obvious that by such an arrangement as this the pins will be loosened even though it has been a considerable length of time since the parts were placed in position. After they have been loosened it is a very simple matter to entirely remove them to permit further dissembling of the parts.

I claim:

1. In a device of the class described, a socketed member having an opening in one wall, the entrance into said socket being reduced, a shank movable in the socket of said member, the end of said shank within the socket being transversely apertured, a pin insertible through the opening in the wall of the socket into said aperture, and means within the socket to force the pin toward the opening in the wall of said socket.

2. In a device of the class described, a socketed member having an opening in one wall, the entrance into said socket being reduced, a shank movable in the socket of said member, the end of said shank within the socket being transversely apertured, a pin insertible through the opening in the wall of the socket into said aperture, and a cam surface in said socket to be engaged by the pin upon rotation of the shank to force said pin toward the opening in the wall of said socket.

3. In a device of the class described, a substantially horizontally disposed socketed member having a restricted entrance thereinto, said member having an opening into its socket through the under side thereof, a shank movable in the socket of said member, the end of the shank within the socket being transversely apertured, a pin insertible into the aperture from the opening in the under side of the member, said shank being rotatable to dispose the pin horizontally, means for holding the shank in this position, and a cam surface formed on the wall of the socket opposite the opening thereinto, said cam surface being engaged by the pin upon rotation of the shank to force the pin toward the opening in the wall of said socket.

In testimony that I claim the foregoing I have hereunto set my hand at Milwaukee, in the county of Milwaukee and State of Wisconsin.

HENRY WEILEDER.